(12) United States Patent
Eytan et al.

(10) Patent No.: US 12,204,231 B2
(45) Date of Patent: Jan. 21, 2025

(54) GLARESHIELD

(71) Applicant: Mobileye Vision Technologies Ltd., Jerusalem (IL)

(72) Inventors: Ori Eytan, Jerusalem (IL); Dan Alon, Mitzpe Yiricho (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 462 days.

(21) Appl. No.: 17/532,121

(22) Filed: Nov. 22, 2021

(65) Prior Publication Data
US 2022/0214599 A1    Jul. 7, 2022

Related U.S. Application Data

(60) Provisional application No. 63/134,358, filed on Jan. 6, 2021.

(51) Int. Cl.
*G03B 11/04* (2021.01)
*B60R 11/00* (2006.01)
*B60R 11/04* (2006.01)

(52) U.S. Cl.
CPC ..... *G03B 11/045* (2013.01); *B60R 2011/0026* (2013.01); *B60R 11/04* (2013.01)

(58) Field of Classification Search
None
See application file for complete search history.

(56) References Cited

U.S. PATENT DOCUMENTS

| 9,871,971 B2 | 1/2018 | Wang et al. |
| 2015/0015713 A1* | 1/2015 | Wang ............... B60R 11/04 348/148 |
| 2016/0023620 A1* | 1/2016 | Matori ............... G03B 11/045 348/148 |
| 2019/0047382 A1 | 2/2019 | Glatfelter |
| 2019/0064636 A1 | 2/2019 | Kang et al. |

FOREIGN PATENT DOCUMENTS

| CN | 105074564 A | 11/2015 |
| CN | 205075748 U | 3/2016 |
| CN | 107635089 A | 1/2018 |
| CN | 111344190 A | 6/2020 |
| CN | 210958477 U | * 7/2020 |
| WO | WO2013123161 A1 | 8/2013 |

OTHER PUBLICATIONS

Chinese Application No. 202111644541.4, First Office Action dated Oct. 17, 2024 and Search Report dated Oct. 15, 2024 with English language translation, 19 pages.

* cited by examiner

*Primary Examiner* — Bao-Luan Q Le
*Assistant Examiner* — Danell L Owens
(74) *Attorney, Agent, or Firm* — Finnegan, Henderson, Farabow, Garrett & Dunner, LLP

(57) ABSTRACT

A glareshield for a camera of a vehicle includes a plurality of similarly shaped ribs on a surface that faces the windshield of the vehicle. The plurality of ribs are configured such that the specular component of reflected light from the plurality of ribs, during all daylight hours, impinges on or passes through an area outside the entrance pupil of the camera, directly or after further reflection from the windshield.

17 Claims, 7 Drawing Sheets

GLARESHIELD

CROSS REFERENCE TO RELATED APPLICATION

The present application claims priority to U.S. Provisional Patent Application No. 63/134,358, filed Jan. 6, 2021, the contents of which are incorporated herein by reference in their entirety.

TECHNICAL FIELD

This disclosure relates to a glareshield for imaging systems or vision systems for vehicles.

BACKGROUND INFORMATION

A typical vehicle vision or imaging system uses one or more cameras to capture images through the windshield of a vehicle. The captured images may be displayed or processed depending on the specific application to aid in the operation of the vehicle. In some cases, in addition to light entering directly through the windshield, light reflected from the dashboard and other surfaces in the vehicle may also fall within the field of view (FOV) of the camera and affect the quality of the captured images. A glareshield (or a stray-light shield) may sometimes be used to block reflections of objects within the vehicle from reaching the camera. In some cases, however, light reflecting from the glare shield may impinge on the camera sensor and affect image quality. Accordingly, a glareshield to alleviate these problems and enable the capture of high-quality images to minimize glare is needed.

SUMMARY

In an embodiment, a glareshield for a camera of a vehicle is disclosed. The glareshield may include a surface configured to face a windshield of the vehicle and a plurality of similarly shaped ribs on the surface. Each rib of the plurality of ribs may include a windshield-facing surface connected to a camera-facing surface to form a vertex angle therebetween. The vertex angle may be between about 40° and about 100°.

In another embodiment, a glareshield for a camera of a vehicle is disclosed. The glareshield may include a surface configured to face a windshield of the vehicle, and a plurality of substantially triangular ribs on the surface. The plurality of ribs may be configured such that a specular component of reflected light from the plurality of ribs during all daylight hours impinges on or passes through an area outside of an entrance pupil of the camera, directly or after further reflection from the windshield.

In yet another embodiment, a glareshield is disclosed. The glareshield may include a surface configured to face a windshield of a vehicle, and a plurality of similarly shaped ribs on the surface. A spacing between adjacent ribs of the plurality of ribs may be less than or equal to a height of a rib of the plurality of ribs.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this disclosure, illustrate exemplary embodiments and, together with the description, are used to explain the disclosed principles. In these drawings, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure. For simplicity and clarity of illustration, the figures depict the general structure of the various described embodiments. Details of well-known components or features may be omitted to avoid obscuring other features, since these omitted features are well-known to those of ordinary skill in the art. Further, elements in the figures are not necessarily drawn to scale. The dimensions of some features may be exaggerated relative to other features to improve understanding of the exemplary embodiments. One skilled in the art would appreciate that the features in the figures are not necessarily drawn to scale and, unless indicated otherwise, should not be viewed as representing proportional relationships between different features in a figure. Additionally, even if it is not specifically mentioned, aspects described with reference to one embodiment or figure may also be applicable to, and may be used with, other embodiments or figures. In the drawings.

DETAILED DESCRIPTION

It should be noted that all numeric values disclosed herein (including all disclosed angles, lengths, widths, thicknesses, ranges, etc.) may have a variation of ±10% (unless a different variation is specified) from the disclosed numeric value. For example, a feature disclosed as being "t" units long (wide, thick, etc.) can vary in length from (t−0.1t) to (t+0.1t) units. Further, all relative terms such as "about," "substantially," "approximately," etc. are used to indicate a possible variation of ±10% (unless noted otherwise or another variation is specified). In some cases, the specification also provides context to the relative terms. For example, a structure described as being substantially triangular may have its vertex angles slightly rounded (as opposed to pointed) and/or its sides slightly curved (as opposed to linear) as shown in the referenced figures.

Unless defined otherwise, all terms of art, notations and other scientific terms or terminology used herein have the same meaning as is commonly understood by one of ordinary skill in the art to which this disclosure belongs. Some of the components, structures, and/or processes described or referenced herein are well understood and commonly employed using conventional methodology by those skilled in the art. Therefore, these components, structures, and processes will not be described in detail. All patents, applications, published applications and other publications referred to herein are incorporated by reference in their entirety. If a definition or description set forth in this disclosure is contrary to, or otherwise inconsistent with, a definition and/or description in these references, the definition and/or description set forth in this disclosure prevails over those in the references that are incorporated herein by reference. None of the references described or referenced herein is admitted as prior art to the current disclosure.

Figure 1A:
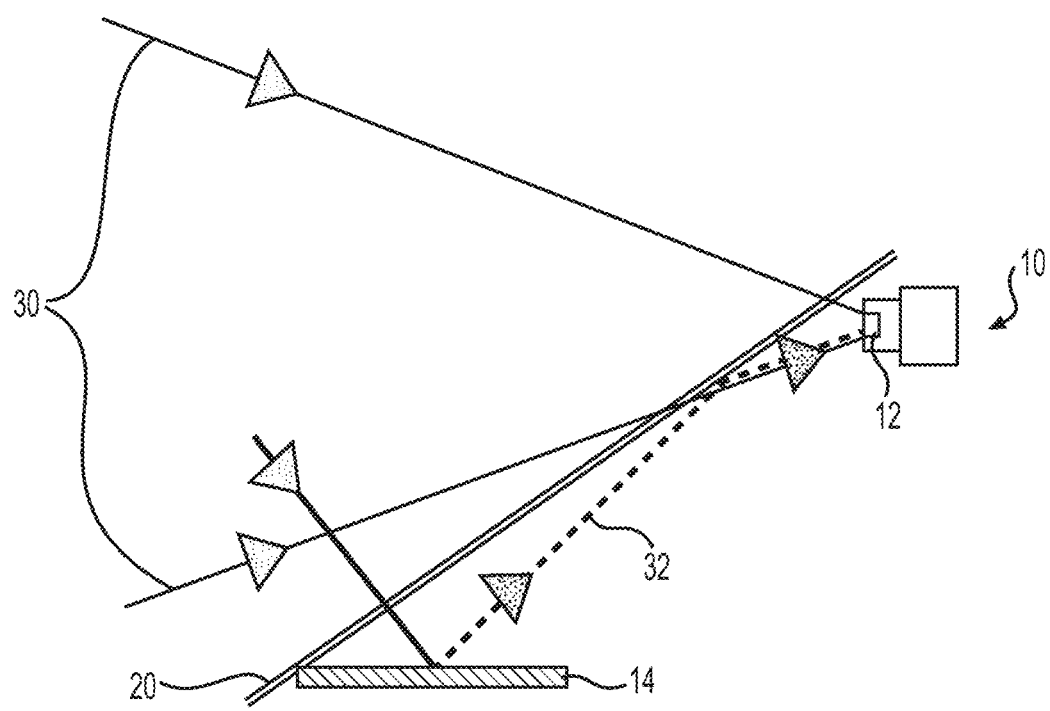
FIG. 1A illustrates an exemplary vehicle imaging system having a camera.
Figure 1B:
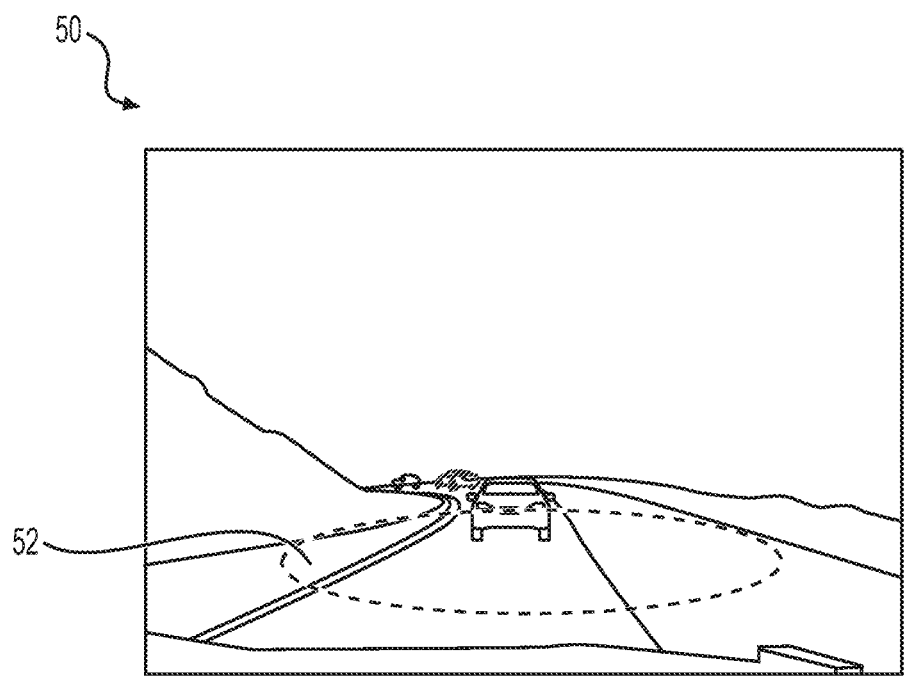
FIG. 1B illustrates an exemplary image captured by the camera of FIG. 1A.

A typical vehicle vision or imaging system includes one or more cameras (e.g., front facing, side facing, rear facing, etc.) installed in the vehicle. These one or more cameras may include a camera installed on the inside of the front windshield of a vehicle (such as, for example, a car, truck, bus, van, etc.). In some embodiments, the one or more cameras may also include one or more cameras installed on a side and/or a rear of the vehicle. Such an imaging system may be used for a variety of functions such as, for example, object detection, lane warning/keeping, autonomous/semi-autonomous navigation, headlight control, etc. FIG. 1A illustrates an exemplary camera 10 of a vehicle imaging system attached inside the front windshield 20 of a vehicle in a front-facing manner. FIG. 1B is an illustration of an exemplary image 50 captured by camera 10. As known to people skilled in the art, camera 10 may be attached to the windshield 20 or other vehicle components (e.g., frame, bracket, etc.) to have a clear view of the scene (e.g., road) in front of the windshield 20. Camera 10 may include any suitable type of camera known in the art and have an analog or a digital image sensor. During operation, rays of light (or light 30) may pass through the windshield 20 and enter the camera 10 through its entrance pupil (or pupil 12) to impinge on the camera's image sensor to create an image (still image, video, etc.) of the scene in front of the windshield 20.

As known to people skilled in the art, pupil 12 of camera 10 is the virtual or optical image of its physical aperture, as seen through the front (or the object side) of the camera's lens system. The size and location of pupil 12 may differ from those of the physical aperture due to the magnification of the lens. If there is no lens or other optical elements in front of the aperture (e.g., as in a pinhole camera), pupil 12 will have a size and location identical to those of the aperture. A lens (and other optical elements) in front of the aperture may increase or decrease the size of pupil 12 as compared to the size of the aperture. Light 30 that impinges on the area of pupil 12 may enter the camera 10 and create image 50.

As illustrated in FIG. 1A, in addition to light 30 that passes through windshield 20 and impinges on pupil 12 directly, light rays (reflected light 32) may also reflect from surfaces within the vehicle (e.g., dashboard 14) and impinge on pupil 12. This reflected light 32 may create glare 52 in the image 50 recorded by the camera 10. In some cases, as illustrated in FIG. 1A, light 32 reflected from dashboard 14 may further reflect off the inside surface of windshield 20 and impinge on pupil 12 to create glare 52. Glare 52 in image 50 may detrimentally affect the visibility of image 50. For example, glare 52 may hide or make it difficult to discern objects in a vicinity of glare 52.

Figure 2A:
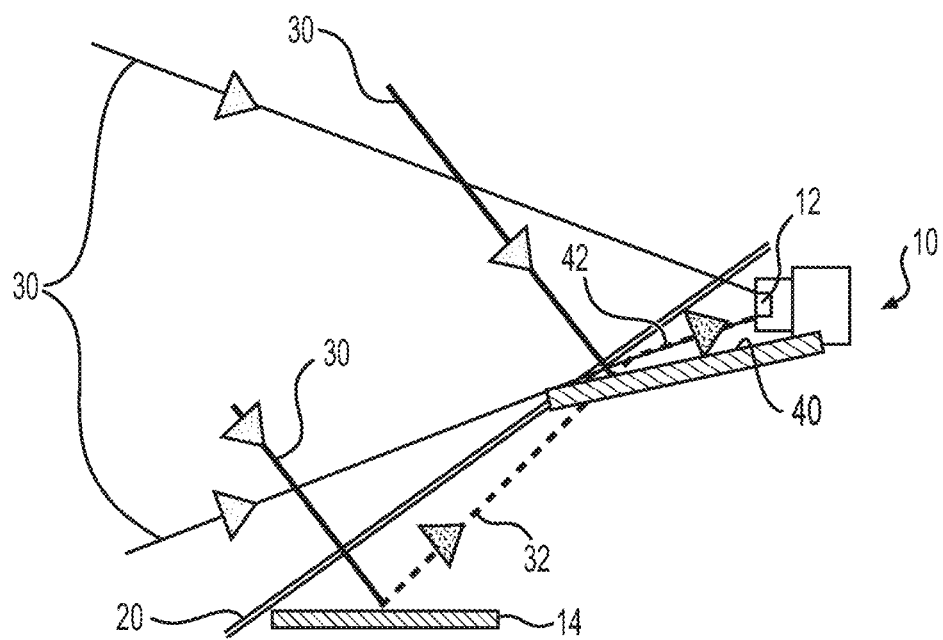
FIG. 2A illustrates a vehicle imaging system having a camera and an exemplary glareshield.
Figure 2B:
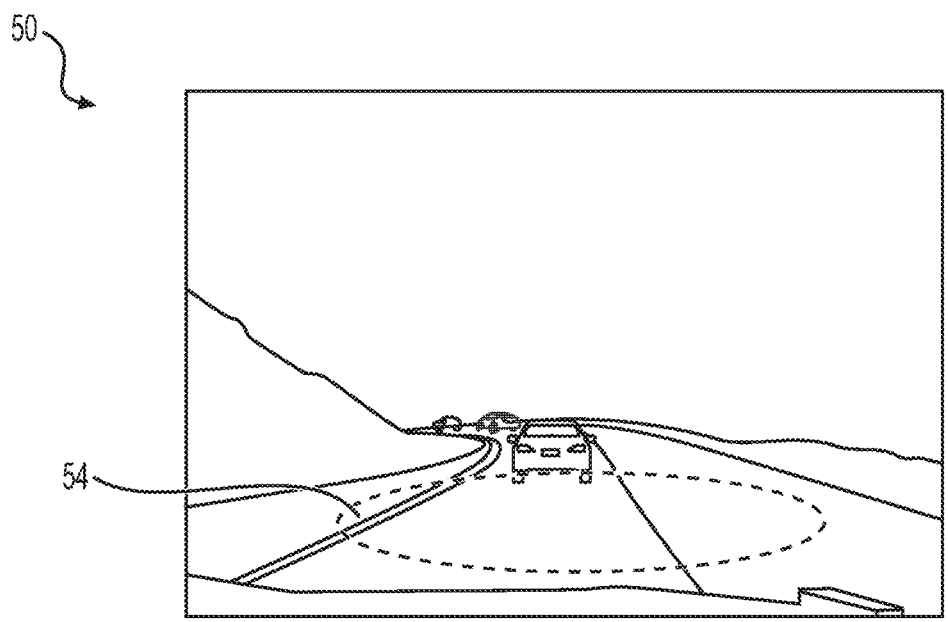
FIG. 2B illustrates an exemplary image captured by the camera of FIG. 2A.

With reference to FIGS. 2A and 2B, in some embodiments, a glareshield 40 may be used to block (or reduce the amount of) the reflected light 32 from dashboard 14 (or other surfaces within vehicle) from impinging on the pupil 12 of camera 10. As illustrated in FIG. 2A, the glareshield 40 may be positioned to physically block all, or a substantial portion, of the reflected light 32 from the camera 10. In some embodiments, the glareshield 40 may be a part of or may be attached to (e.g., to the housing of) the camera 10. It is also contemplated that, in some embodiments, the glareshield 40 may be attached to the windshield 20 or to other components (e.g., bracket, etc.) of the vehicle. Glareshield 40 may have a top surface 44 that faces the windshield 20. Generally, as illustrated in FIG. 2A, the top surface 44 of glareshield 40 may be inclined with respect to the windshield 20. In some cases, light 30 passing through the windshield 20 may impinge on and reflect from the top surface 44 of the glareshield 40. A portion of the reflected light 42 from the glareshield 40 may impinge on the pupil 12 of camera 10 (directly or after further reflections from the windshield 20) and create glare 54 in the image 50 (see FIG. 2B).

In general, the glareshield 40 may be configured to reduce the reflection of light therefrom. In some embodiments, the glareshield 40, or the top surface 44 of glareshield 40, may be made of or covered with a light absorbing material. In some embodiments, the top surface 44 may have a texture configured to reduce the reflection of light. Additionally, or alternatively, in some embodiments, the top surface 44 of the glareshield 40 may include features or structures configured to reflect the incident light 30 away from camera 10 or pupil 12 of camera 10. For example, with reference to FIG. 2A, the structures on top surface 44 of glareshield 40 may reflect the incident light 30 such that the reflected light 42 does not impinge on the pupil 12 of camera 10 (directly or after further reflections from the windshield 20). In the example shown in FIG. 2A, the structures on top surface 44 are shaped in a manner to direct reflected incident light 30 (by one or more reflections off the structures) such that the reflected light is reflected outside a region where the pupil of the camera is located.

Figure 3A:
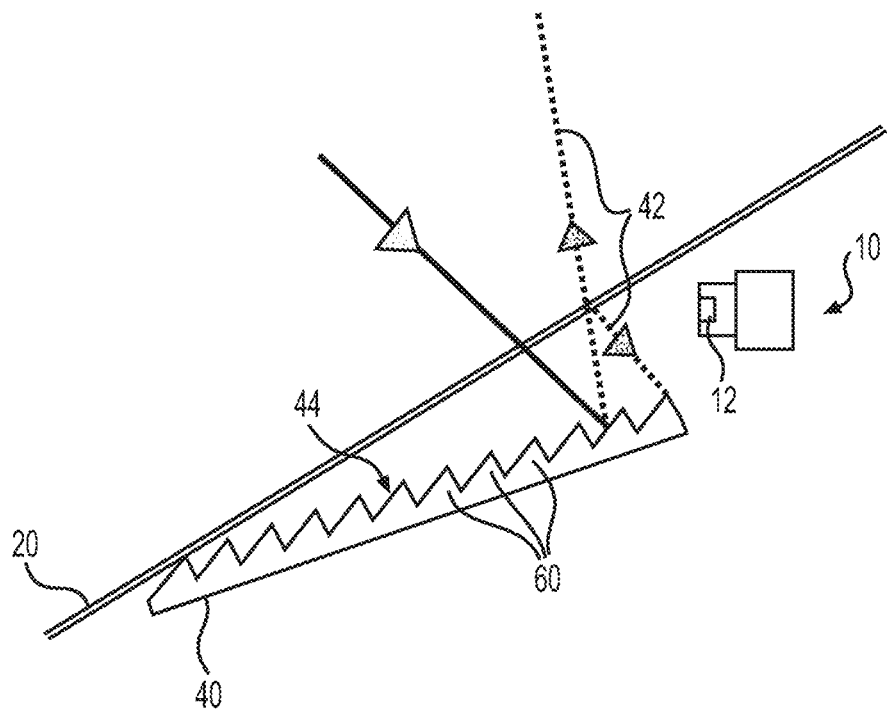
FIGS. 3A and 3B illustrate an exemplary embodiment of a glareshield of the current disclosure.
Figure 3B:
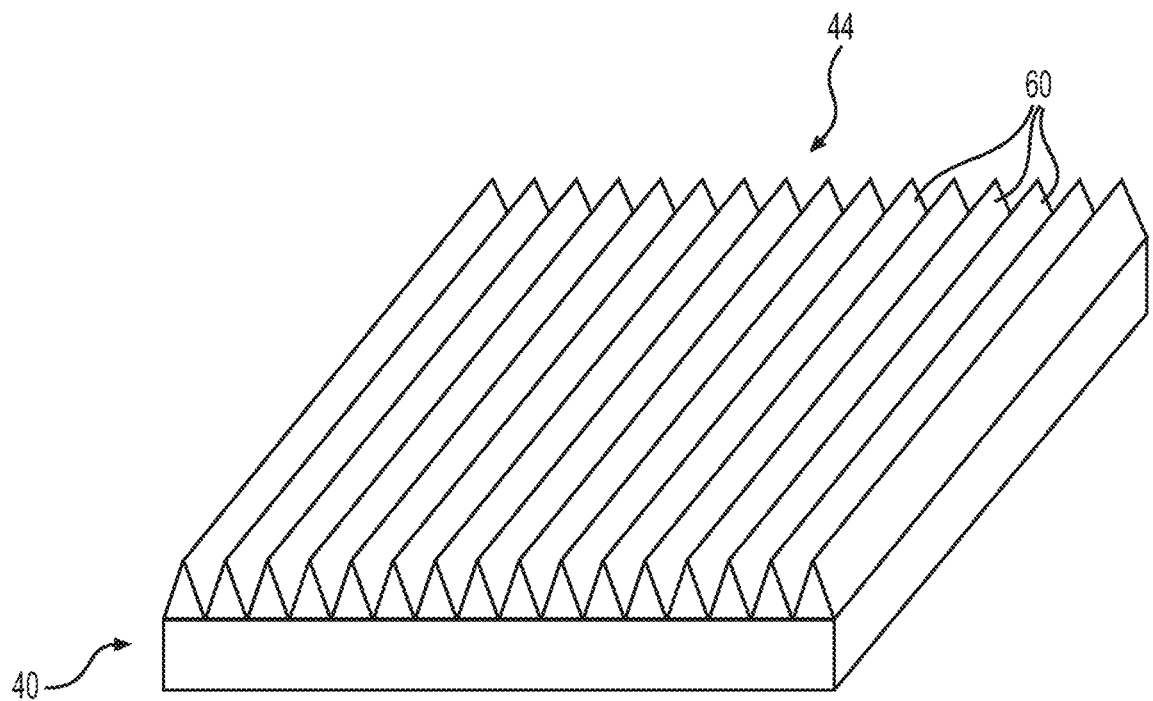

FIGS. 3A and 3B illustrate an exemplary glareshield 40 with a top surface 44 that includes exemplary structures configured to reflect incident light 30 away from pupil 12 of camera 10. In the embodiment illustrated in these figures, these structures include a plurality of triangular ribs 60 arranged side-to-side on the top surface 44 to form a surface having a saw-tooth profile. In some embodiments, as illustrated in FIG. 3B, the ribs 60 may extend over the entire area of the top surface 44 of the glareshield 40. However, this is not a requirement. In some embodiments, the ribs 60 may extend over only a smaller portion (e.g., a central portion) of the top surface 44.

As illustrated in FIG. 3A, a ray of light 30 (e.g., sunlight) that enters the vehicle through windshield 20 may impinge on a rib 60 on the top surface 44 of glareshield 40 and get reflected towards the windshield 20. A portion of the reflected light 42 may pass through the windshield 20 and exit the vehicle. Another portion of the reflected light 42 may be reflected off the back side of the windshield 20 back into the vehicle. This re-reflected light 42 may again reflect off the ribs 60 of the glareshield 40 towards the windshield 20. It is contemplated that a portion of the reflected light 42 from the windshield 20 or the glareshield 40 may be directed towards the camera 10. However, in embodiments of the current disclosure, the glareshield 40 and the ribs 60 may be configured such that the portion of the reflected light 42 directed towards the camera 10 does not impinge on the pupil 12 of camera 10. Therefore, in embodiments of the current disclosure, reflections from within the vehicle do not create a glare 54 in the image 50 produced by camera 10 (see FIG. 2B). In other words, the glare shield top surface may be controlled, e.g., via design of the shape, material and other geometrical and optical characteristics of the glare shield top surface and the ribs so as to not create a glare 54 in the image 50 produced by camera 10.

FIG. 3A illustrates an exemplary case where the sun is high in the sky in front of the vehicle. In this case, the light 30 entering the windshield 20 is reflected by the glareshield 40 such that the reflected light 42 bypasses the camera 10 entirely. Based on various factors (e.g., time of day, direction of travel, season, etc.), light 30 may pass through the windshield 20 at different angles. The plurality of ribs 60 (or other structures) of the glareshield 40 may be configured such that a ray of light 30 passing through the windshield 20 and impinging on the glareshield 40 at any angle may be directed away from the camera pupil 12. In other words, the reflected light 42 from the glareshield 40 to the windshield 20 may not be at an angle such that the component of light re-reflected from the windshield 20 will be directed into the camera pupil 12.

Figure 4A:
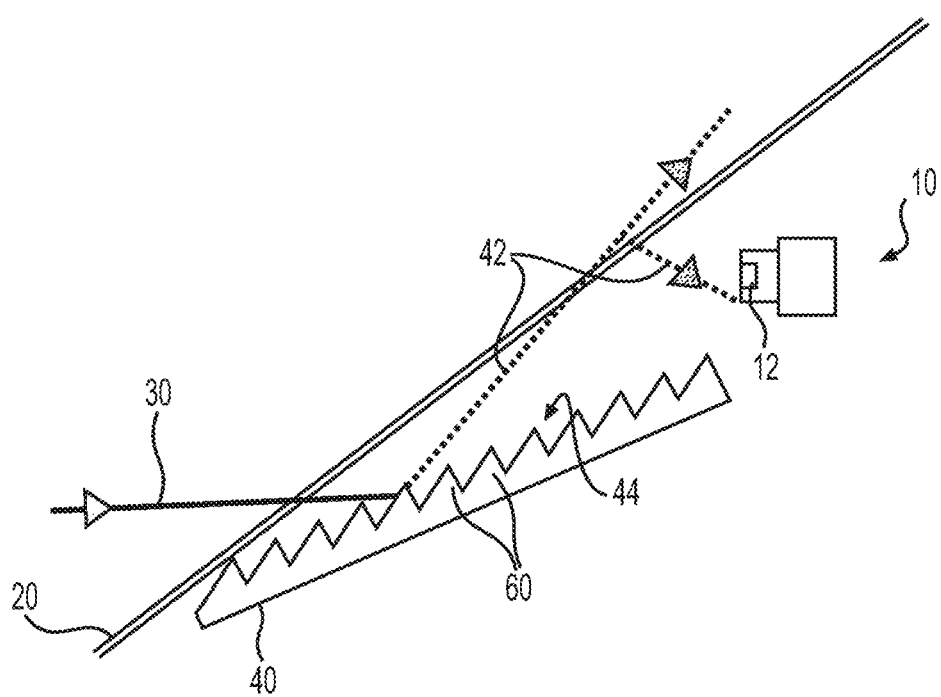
FIGS. 4A and 4B illustrate specular reflection of sunlight from the glareshield of FIG. 3A during different times of day.
Figure 4B:
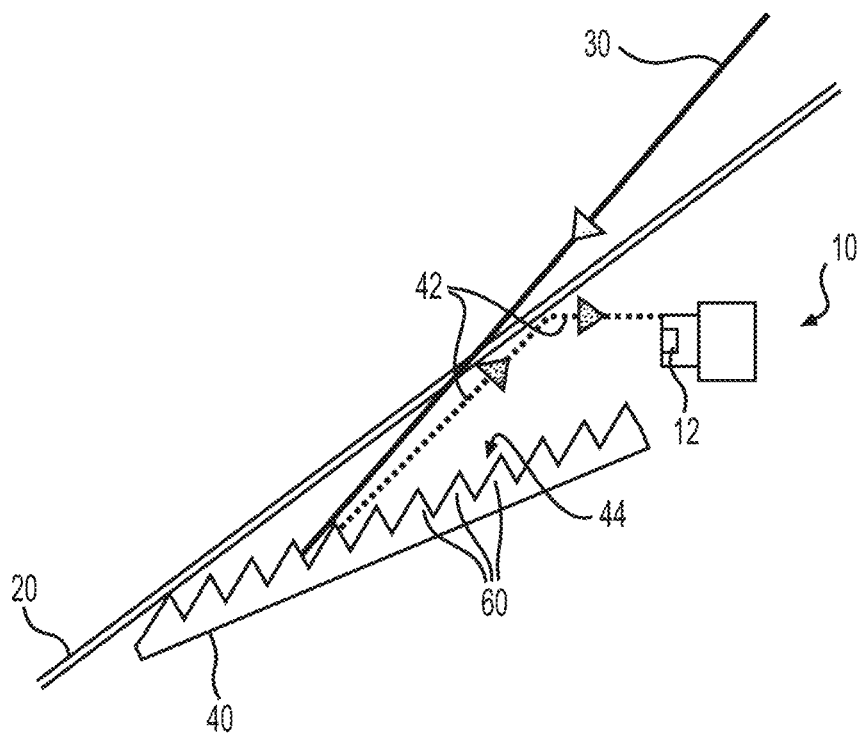

FIG. 4A illustrates an exemplary case where the sun is on the horizon in front of the vehicle. In such a case, light 30 that passes through the windshield 20 impinges the glareshield 40 at a relatively low angle, and light 42 is reflected from the glareshield 40 to the windshield 20 such that the component of the light re-reflected from the windshield 20 impinges the camera 10 below the pupil 12. FIG. 4B illustrates an exemplary case where the sun is high in the sky behind the vehicle. In this case, light 30 that passes through the windshield 20 impinges the glareshield 40 at a relatively higher angle, and light 42 may be reflected from the glareshield 40 to the windshield 20 such that the component of the light re-reflected from the windshield 20 impinges the camera 10 above the pupil 12. Thus, the reflection of sunlight from the glareshield 40 during all daylight hours may be such that the reflected light 42, directly or after further reflection from the windshield, impinges on or passes through an area outside of the pupil 12 of camera 10.

Figure 5:
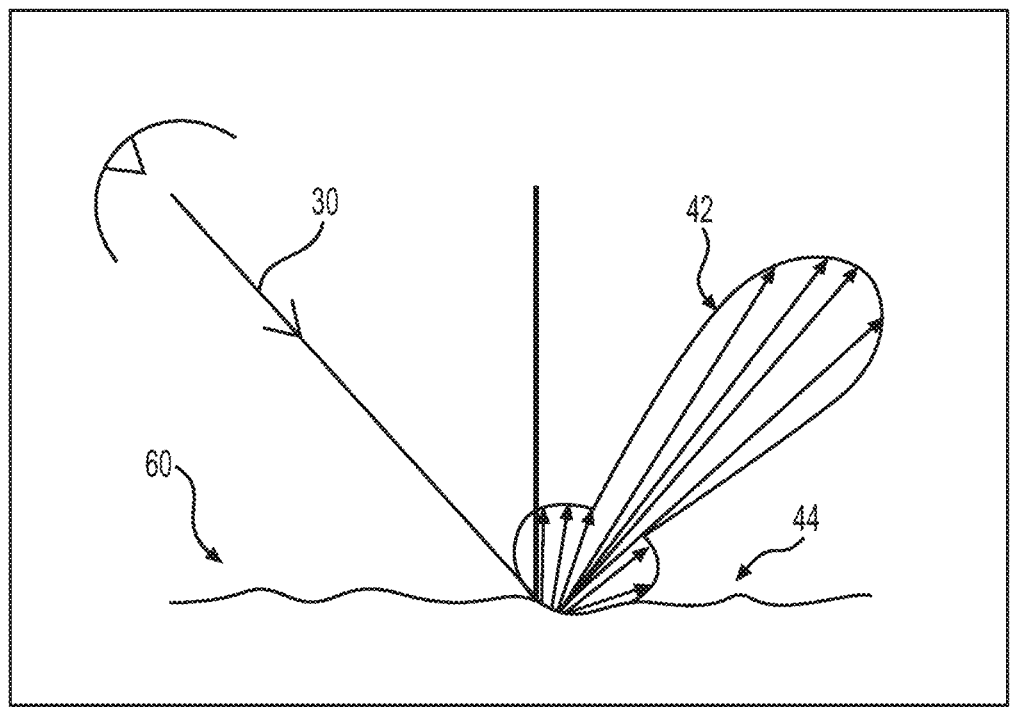
FIG. 5 is a schematic illustration of quasi-specular reflection of sunlight from the glareshield of FIG. 3A.

In the exemplary embodiments discussed above, the light-reflecting surfaces of the plurality ribs 60 are assumed to be specular (or perfectly flat) such that incident light is reflected in a single outgoing direction (in accordance with the law of reflection that states that the incident angle is equal to the reflected angle). However, while the light-reflecting surfaces of the ribs 60 may be generally flat, in some embodiments, these surfaces may not be perfectly flat because the manufacturing processes (e.g., injection molding, etc.) used to fabricate the ribs 60 may introduce localized roughness on these surfaces. As a result, as schematically illustrated in FIG. 5, the reflection from the light-reflecting surfaces of the ribs 60 may be quasi-specular where light is reflected over a range of angles near the specular direction. As would be recognized by a person skilled in the art, during quasi-specular reflection, light reflected from the surface at an angle that fits the law of reflection (i.e., the specular component of reflection) will be higher in magnitude (i.e., higher intensity, energy, luminescence, etc.) than the light reflected at other angles. Therefore, in embodiments where the glareshield 40 reflects light in a quasi-specular manner, some portion of the reflected light 42 may impinge the camera within the area of its pupil 12. However, the glareshield 40 may be configured such that the specular component of the reflected light does not impinge on pupil 12, and only the non-specular components of the reflected light below a threshold value of magnitude (intensity, etc.) impinges on pupil 12. The threshold value of magnitude may be any value that does not cause noticeable (or problematic) glare in the image produced by the camera 10.

Figure 6A:
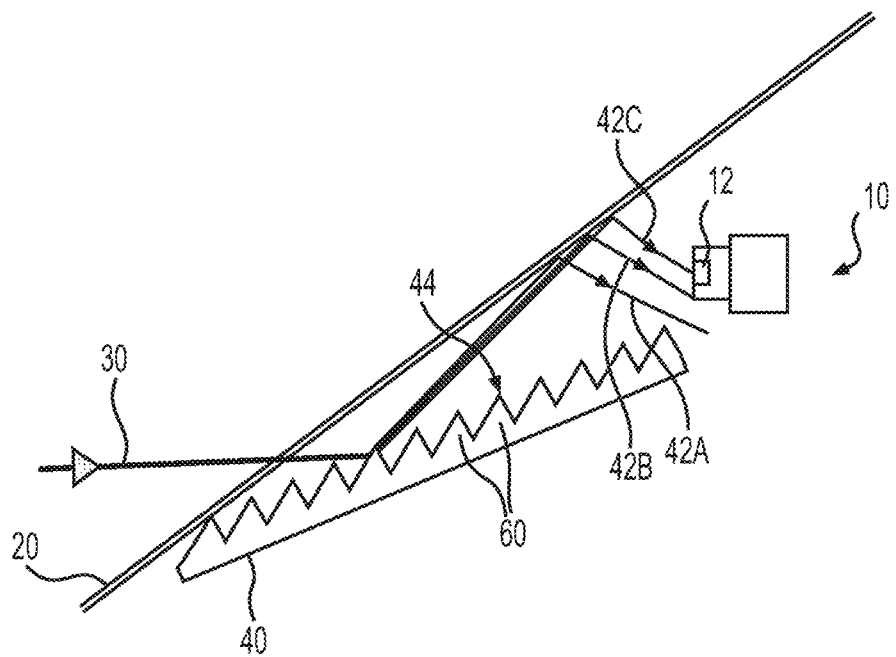
FIGS. 6A and 6B illustrate the quasi-specular reflection of sunlight from the glareshield of FIG. 3A during different times of day.
Figure 6B:
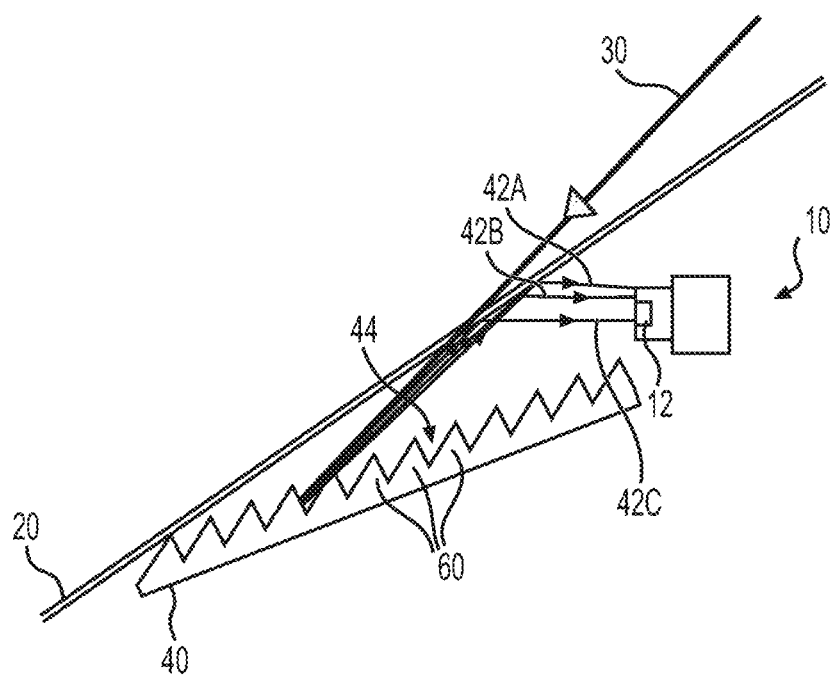

FIGS. 6A and 6B illustrate exemplary embodiments where light 30 impinges a quasi-specular glareshield 40 at relatively lower and higher angles, respectively (i.e., during different daylight hours). In these figures, 42A represents light at the highest magnitude (the specular component of reflection), 42B represents a non-specular component of reflection at the threshold magnitude, and 42C represents a non-specular component of reflection having a value of magnitude below the threshold magnitude. As illustrated in these figures, light 42A reflected in a specular manner is directed well away from the camera pupil 12, light 42B at the threshold magnitude impinges the camera just outside the area of the pupil 12, and light 42C below the threshold magnitude impinges within the area of the pupil 12. However, since the threshold magnitude is selected as the value of magnitude that does not create a glare, reflected light that enters the camera 10 does not produce a glare in the image.

The threshold value of magnitude may be selected in any manner (experimentally, numerically, analytically, etc.). For example, experiments (numerical computations, or analytical relations, etc.) may indicate that reflected light 42 having a magnitude that is, for example, $\frac{1}{8}^{th}$ (or $\frac{1}{4}^{th}$, or $\frac{1}{5}^{th}$, or $\frac{1}{6}^{th}$) the magnitude of incident light 30 does not result in noticeable glare (or a problematic glare) in the image produced by the camera. In such cases, this value of magnitude may be selected as the threshold magnitude. It should be noted that any measure of magnitude of light may be used to determine the threshold magnitude.

Figure 7:
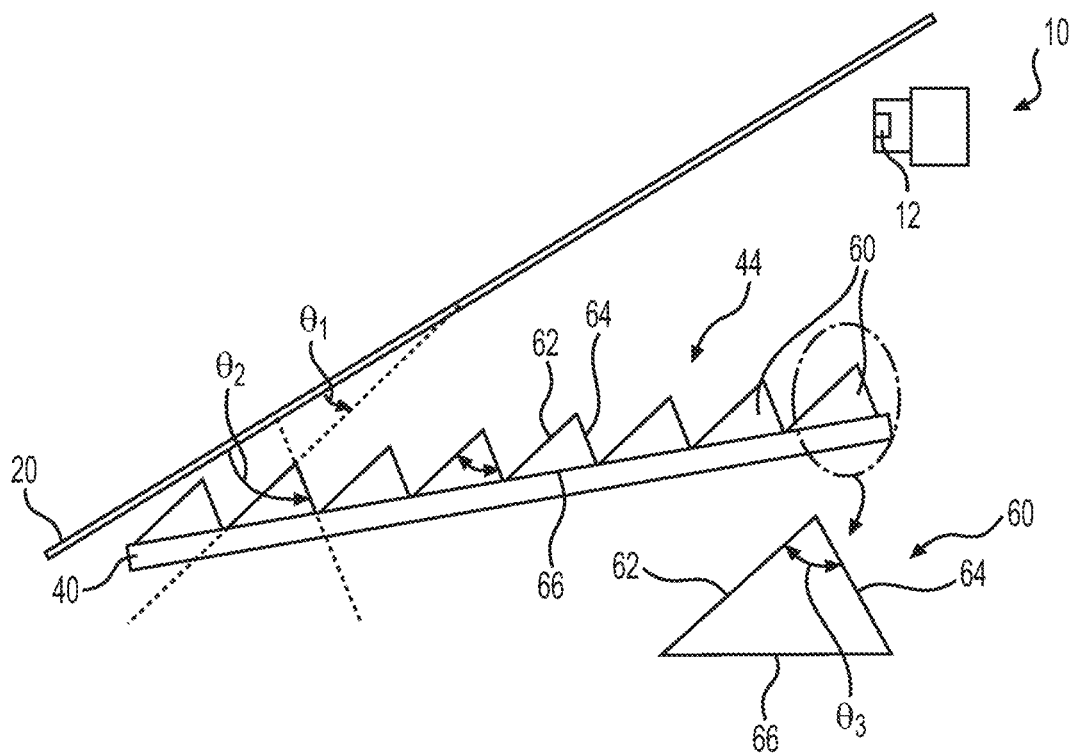
FIG. 7 is an illustration of the exemplary glareshield of FIG. 3A.

As indicated in the figures above, the plurality of ribs 60 may be arranged on the top surface 44 of the glareshield 40 to form a corrugated shape with a saw-tooth cross-sectional profile. With reference to FIG. 7, the glareshield 40 may be inclined with respect to the windshield 20. Although not a requirement, in typical vehicles, the windshield 20 may also be inclined with respect to a horizontal axis. In the embodiment of the ribs 60 illustrated in FIG. 7, each rib 60 has a triangular cross-sectional shape with a windshield-facing surface 62, a camera-facing surface 64, and a base 66 forming the three sides of the triangle. As illustrated in FIG. 7, the windshield-facing surface 62 faces the windshield 20, the camera-facing surface 64 faces the camera 10, and the base 66 is coincident with the top surface 44 of the glareshield 40.

To ensure that the specular component of the light reflected from the glareshield 40 does not impinge on the pupil 12 (and if any portion of the reflected light does impinge on the pupil 12, the magnitude of the impinging portion is below a threshold magnitude) during all times of the day, the windshield-facing and camera-facing surfaces 62, 64 of each rib 60 may be inclined with respect to the windshield 20. With reference to FIG. 7, in some embodiments, the windshield-facing surface 62 of each rib 60 makes an angle of $\theta_1$ with the windshield 20 to move the specular component of reflected light away from the camera pupil when the sun is front of the vehicle. In general, angle $\theta_1$ may vary between about 0° and 90°. In some embodiments, angle $\theta_1$ may be greater than 0° and less than 90°. In some embodiments, angle $\theta_1$ may vary between about 10°-70°, between about 20°-50°, or between about 30°-40°. In some embodiments, for example, when top surface 44 of glareshield 40 has a mirror-like surface finish, angle $\theta_1$ may vary between about 5°-15°, or may be about 10°. In some embodiments, for example, when top surface 44 of glareshield 40 has a quasi-specular surface finish, angle $\theta_1$ may vary between about 10°-40°, or between about 20°-30°. When the sun is low on the horizon in front of the vehicle (for example, see FIGS. 4A and 6A), a larger value of angle $\theta_1$ will cause light to be reflected from the glareshield 40 to the windshield 20 such that the component of light re-reflected from the windshield 20 to the camera 10 is directed below the pupil 12.

Alternatively, or additionally, in some embodiments, the camera-facing surface 64 of glareshield 40 makes an angle of $\theta_2$ with the windshield 20 to move the specular component of reflected light away from the camera pupil 12 when the sun is behind of the vehicle. In general, angle $\theta_2$ may be less than or equal to about 100°. In some embodiments, angle $\theta_2$ may vary between about 100°-60°, between about 100°-70°, or between about 90°-70°. When the sun is high in the sky behind the vehicle (see FIGS. 4B and 6B), a smaller value of angle $\theta_2$, will cause the light to be reflected from the glareshield 40 to the windshield 20 such that the component of the light re-reflected from the windshield 20 to the camera 10 is directed above the pupil 12.

It should be noted that, in the discussion above (as illustrated in FIG. 7), angles $\theta_1$ and $\theta_2$ are measured counterclockwise from the windshield 20 to the respective surfaces of the rib 60. It should also be noted that, although windshield 20 is illustrated as a planar object having a linear profile in FIG. 7 (and other figures), this is only for the sake of simplicity. In some embodiments, windshield 20 may have a curved profile. In such embodiments, angles $\theta_1$ and $\theta_2$ are measured with respect to a tangent at the windshield surface.

In some embodiments, in addition to or alternative to $\theta_1$ and $\theta_2$ having the angles described above, the vertex angle $\theta_3$ between the windshield-facing and camera-facing surfaces 62, 64 of each rib 60 may be between about 40° and about 100°. In some embodiments, angle $\theta_3$ may be between about 45°-90°, between about 60°-90°, or between about 70°-90°.

Figure 8A:
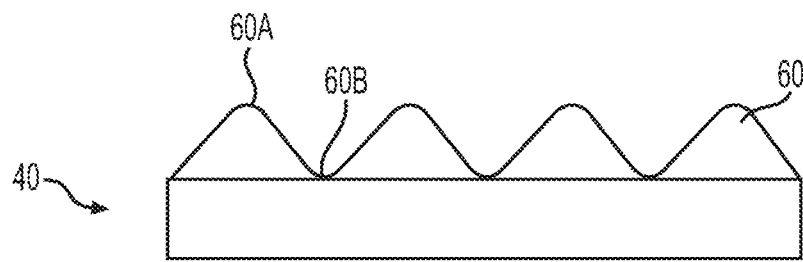
FIGS. 8A, 8B, and 8C are illustrations of different exemplary embodiments of the glareshields of the current disclosure.
Figure 8B:
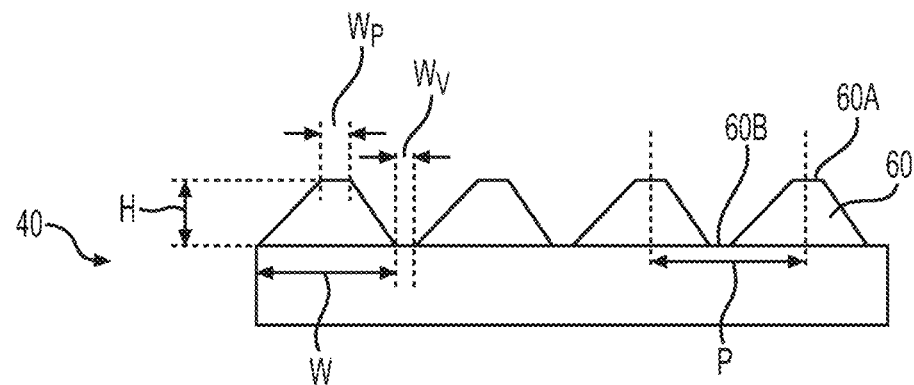
Figure 8C:
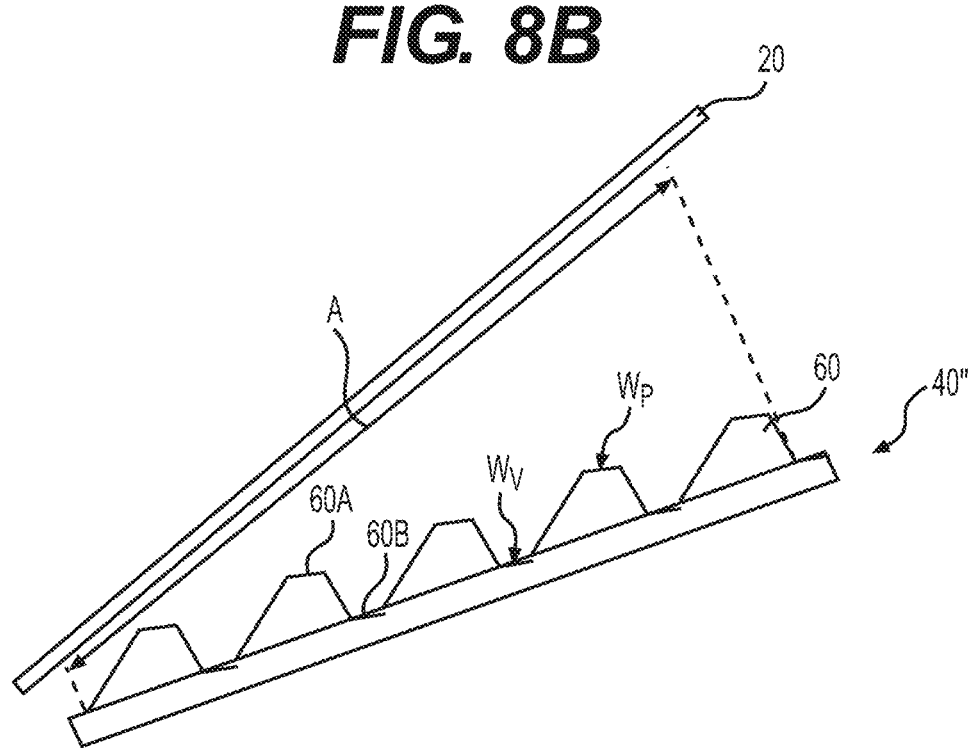

In the figures above (e.g., FIG. 7), for ease of illustration, each rib 60 of glareshield 40 is illustrated as being perfectly triangular (i.e., with sharp corners and straight sides) with adjacent ribs contacting each other at their base. However, this is not a requirement. In general, as illustrated in FIGS. 8A-8C, the peaks 60A and valleys 60B of the triangular ribs 60 may be rounded (see FIG. 8A) or flat (see FIGS. 8B and 8C) and adjacent ribs 60 may not contact each other (see FIGS. 8B and 8C). That is, in general, each rib 60 may only be substantially triangular, and the plurality of ribs 60 may only have a cross-sectional profile that is substantially sawtooth shaped. As illustrated in FIG. 8B, the width of each (rounded or flat) peak $W_p$ and/or the width of each (rounded or flat) valley $W_v$ may be smaller than the width W of the rib 60. With reference to FIG. 8B, width $W_v$ is the spacing between adjacent ribs 60. Therefore, in general, the spacing between adjacent ribs 60 ($W_v$) is smaller than the width W of the ribs 60. In some embodiments, the widths $W_p$ and/or $W_v$ may be less than or equal to about 10% of W (i.e., $W_p$ and/or $W_v \leq 0.1$ W). In some embodiments, the total width of all the peaks 60A and valleys 60B of the glareshield 40 (i.e., $\Sigma(W_p+W_v)$) may be less or equal to about 15% (or less or equal to about 10%) of the total width of all the ribs 60 (i.e., $\Sigma W$) in the glareshield 40. It is also contemplated that, in some embodiments, $W_v$ may be larger than the above listed values (e.g., $W_v$ may be greater than or equal to about W) with $W_p \leq$ about 0.1 W.

The size of the glareshield 40 and the ribs 60 may depend on the application. In some embodiments, the height H of each rib 60 may be between about 0.5-5 mm, and the width W of each rib 60 may be between about 0.5-5 mm. In some embodiments, the pitch P of the ribs 60 (i.e., the spacing between adjacent ribs 60) may be between about 1-5 mm. In some embodiments, the width of each peak $W_p$ and/or each valley $W_v$ of the ribs 60 may be less than or equal to the height H of a rib 60, or less than or equal to about 15% (or $\leq$about 10%) of the height H of a rib 60 (i.e., $W_p$ and/or $W_v \leq 0.15$ H or $\leq 0.10$ H). With reference to FIG. 8C, in some embodiments, the total width of all the peaks 60A and valleys 60B of the glareshield 40 (i.e., $\Sigma(W_p+W_v)$) may be less or equal to about 15% (or $\leq$about 10%) of the area A of the ribs 60 projected on the windshield 20.

Glareshield 40 may be fabricated from any suitable material (such as, for example, a polymeric or plastic material) using any suitable process (such as, for example, injection molding). In some embodiments, a dark colored or a black colored plastic material may be used to form glareshield 40. In some embodiments, the glareshield may be formed using a dark colored (or black) non-reflecting or light absorbing material.

The above-described embodiments of the glareshield are only exemplary. Many variations are possible. For example, although each rib of the disclosed exemplary glareshields is illustrated as being similarly shaped, this is only exemplary. It is contemplated that, in some embodiments, the glareshield may include ribs of different shapes. It should also be noted that, although some features of the current disclosure are described with reference to a front-facing camera of a vehicle, this is only exemplary. As would be recognized by a person skilled in the art, some or all of the disclosed features may alternatively or additionally be incorporated in cameras that face in other directions (e.g., rear-facing, side-facing, etc.) Other embodiments of the glareshield will be apparent to those skilled in the art from consideration of glareshields disclosed herein.

What is claimed is:

1. A glareshield for a camera of a vehicle, comprising:
a surface configured to face a windshield of the vehicle; and
a plurality of similarly shaped ribs on the surface, wherein each rib of the plurality of ribs includes a windshield-facing surface connected to a camera-facing surface to form a vertex angle therebetween, wherein the vertex angle is between about 40° and about 100°, and wherein an angle between the windshield and the camera-facing surface of each rib is less than or equal to about 100°.

2. The glareshield of claim 1, wherein the vertex angle is between about 45° and about 90°.

3. The glareshield of claim 1, wherein each rib of the plurality of ribs is substantially triangular shaped, and the windshield-facing surface and the camera-facing surface of each rib are arranged to form opposite sides of a triangle.

4. The glareshield of claim 1, wherein the plurality of ribs have a cross-sectional profile that is substantially sawtooth shaped.

5. The glareshield of claim 1, wherein an angle between the windshield and the windshield-facing surface of each rib is less than or equal to about 90°.

6. The glareshield of claim 1, wherein a height of each rib is between about 0.5 mm and about 5 mm, and a width of each rib is between about 0.5 mm and about 5 mm.

7. The glareshield of claim 6, wherein a pitch of the plurality of ribs is between about 1 mm and about 5 mm.

8. The glareshield of claim 1, wherein the glareshield is formed of a dark colored polymeric or plastic material.

9. A glareshield for a camera of a vehicle, comprising:
a surface configured to face a windshield of the vehicle; and
a plurality of substantially triangular ribs on the surface, wherein the plurality of ribs are configured such that a specular component of reflected light from the plurality of ribs during all daylight hours impinges on or passes through an area outside of an entrance pupil of the camera, directly or after further reflection from the windshield, wherein each rib of the plurality of ribs includes a windshield-facing surface and a camera-facing surface arranged to form two sides of a triangle, and wherein an angle between the windshield and the camera-facing surface of each rib is less than or equal to about 100°.

10. The glareshield of claim 9, wherein a vertex angle between the windshield-facing surface and the camera-facing surface of each rib is between about 40° and about 100°.

11. The glareshield of claim 9, wherein an angle between the windshield and the windshield-facing surface of each rib is less than or equal to about 90°.

12. The glareshield of claim 9, wherein a pitch of the plurality of ribs is between about 1 mm and about 5 mm, and each rib of the plurality of ribs includes a height between about 0.5 mm and about 5 mm, and a width between about 0.5 mm and about 5 mm.

13. A glareshield, comprising:
a surface configured to face a windshield of a vehicle; and
a plurality of similarly shaped ribs on the surface, wherein a spacing between adjacent ribs of the plurality of ribs is less than or equal to a height of a rib of the plurality of ribs, wherein each rib of the plurality of ribs includes a windshield-facing surface and a camera-facing surface arranged to form two sides of a triangle, and wherein an angle between the windshield and the camera-facing surface is less than or equal to about 100°.

14. The glareshield of claim 13, wherein a cross-sectional profile of the plurality of ribs is substantially sawtooth shaped.

15. The glareshield of claim 13, wherein a pitch of the plurality of ribs is between about 1 mm and about 5 mm, and each rib of the plurality of ribs includes a height between about 0.5 mm and about 5 mm, and a width between about 0.5 mm and about 5 mm.

16. The glareshield of claim 13, wherein a vertex angle between the windshield-facing surface and the camera-facing surface is between about 40° and about 100°.

17. The glareshield of claim 13, wherein an angle between the windshield and the windshield-facing surface is less than or equal to about 90°.

* * * * *